United States Patent
Niu et al.

(10) Patent No.: US 12,543,220 B2
(45) Date of Patent: Feb. 3, 2026

(54) SIDELINK CONTROL INFORMATION (SCI) IN NEW RADIO (NR) UNLICENSED

(71) Applicant: Apple Inc., Cupertino, CA (US)

(72) Inventors: Huaning Niu, San Jose, CA (US); Chunxuan Ye, San Diego, CA (US); Oghenekome Oteri, San Diego, CA (US); Yushu Zhang, Beijing (CN); Hong He, San Jose, CA (US); Dawei Zhang, Saratoga, CA (US); Weidong Yang, San Diego, CA (US); Wei Zeng, San Diego, CA (US); Sigen Ye, San Diego, CA (US)

(73) Assignee: Apple Inc., Cupertino, CA (US)

( * ) Notice: Subject to any disclaimer, the term of this patent is extended or adjusted under 35 U.S.C. 154(b) by 326 days.

(21) Appl. No.: 18/309,516

(22) Filed: Apr. 28, 2023

(65) Prior Publication Data
US 2023/0354429 A1    Nov. 2, 2023

Related U.S. Application Data

(60) Provisional application No. 63/336,322, filed on Apr. 29, 2022.

(51) Int. Cl.
| | |
|---|---|
| *H04W 4/00* | (2018.01) |
| *H04W 16/14* | (2009.01) |
| *H04W 72/25* | (2023.01) |
| *H04W 72/40* | (2023.01) |
| *H04W 74/00* | (2009.01) |
| *H04W 74/0808* | (2024.01) |
| *H04W 74/0816* | (2024.01) |

(52) U.S. Cl.
CPC ....... *H04W 74/0816* (2013.01); *H04W 16/14* (2013.01); *H04W 72/25* (2023.01); *H04W 72/40* (2023.01); *H04W 74/002* (2013.01); *H04W 74/0808* (2013.01)

(58) Field of Classification Search
CPC . H04W 74/0816; H04W 16/14; H04W 72/25; H04W 74/002; H04W 4/40
See application file for complete search history.

(56) References Cited

U.S. PATENT DOCUMENTS

2022/0167402 A1* 5/2022 Liu .................... H04W 28/04

OTHER PUBLICATIONS

This Technical Specification has been produced by the 3rd Generation Partnership Project (3GPP); 3GPP TS 36.101 V16.13.0; Mar. 2022.

(Continued)

*Primary Examiner* — Omoniyi Obayanju
(74) *Attorney, Agent, or Firm* — Eschweiler & Potashnik, LLC

(57) ABSTRACT

A user equipment (UE), including a vehicle to everything (V2X) device, a baseband processor or other network device can operate in an unlicensed network to acquire a channel occupancy time (COT) for sidelink (SL) transmission and provide sidelink control information (SCI) with a first stage SCI in a physical sidelink control channel (PSCCH) and a second stage SCI in a physical sidelink shared channel (PSSCH). The first stage SCI or the second stage SCI can provide COT indications to a receiving UE device that enable COT sharing in a sidelink unlicensed COT (SL-U COT) for SL communication.

20 Claims, 8 Drawing Sheets

(56) References Cited

OTHER PUBLICATIONS

This Technical Specification has been produced by the 3rd Generation Partnership Project (3GPP); 3GPP TS 36.101 V16.13.0; pp. 612-1729; Mar. 2022.
Annex A (normative): Measurement channels; 3GPP TS 36.101 V16.13.0; Mar. 2022.
3rd Generation Partnership Project; Technical Specification Group Radio Access Network; Physical layer procedures for shared spectrum channel access (Release 17); 3GPP TS 37.213 V17.1.0; Mar. 2022.
Transmitter characteristics; 3GPP TS 38.101-1 V17.5.0; Mar. 2022.
3rd Generation Partnership Project; Technical Specification Group Radio Access Network; NR; Physical channels and modulation (Release 17); 3GPP TS 38.211 V17.1.0; Mar. 2022.
3rd Generation Partnership Project; Technical Specification Group Radio Access Network NR; Physical layer procedures for data (Release 17); 3GPP TS 38.214 V17.1.0; Mar. 2022.
LTE; 5G; Physical layer procedures for shared spectrum channel access (3GPP TS 37.213 version 16.3.0 Release 16); ETSI TS 137 213 V16.3.0; Nov. 2020.
International Preliminary Report on Patentability dated Oct. 29, 2024 in connection with Application No. PCT/US2023/020116.

\* cited by examiner

SIDELINK CONTROL INFORMATION (SCI) IN NEW RADIO (NR) UNLICENSED

CROSS-REFERENCE TO RELATED APPLICATIONS

The application claims the benefit of U.S. Provisional Patent Application 63/336,322 filed Apr. 29, 2022, entitled "SIDELINK CONTROL INFORMATION (SCI) IN NEW RADIO (NR) UNLICENSED," the contents of which are herein incorporated by reference in their entirety.

FIELD

The present disclosure relates to wireless technology including sidelink control information (SCI) in a new radio (NR) unlicensed network.

BACKGROUND

Mobile communication in the next generation wireless communication system, 5G, or new radio (NR) network will provide ubiquitous connectivity and access to information, as well as ability to share data, around the globe. 5G networks and network slicing will be a unified, service-based framework that will target to meet versatile and sometimes, conflicting performance criteria to provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions. Another type of mobile communication includes vehicle communication, where vehicles communicate or exchange vehicle related information. The vehicle communication can include vehicle to everything (V2X) devices or a V2X user equipment (UE), which includes vehicle to vehicle (V2V), vehicle to infrastructure (V2I) and vehicle to pedestrian (V2P) where direct communication without a base station may be employed, such as in a sidelink (SL) communication.

In some situations, vehicle related information is intended for a single vehicle or other entity. In other situations, such as emergency alerts, vehicle related information is intended for a large number of vehicles or other devices or component entities. The emergency alerts can include collision warnings, control loss warnings, and the like.

DETAILED DESCRIPTION

Figure 1:
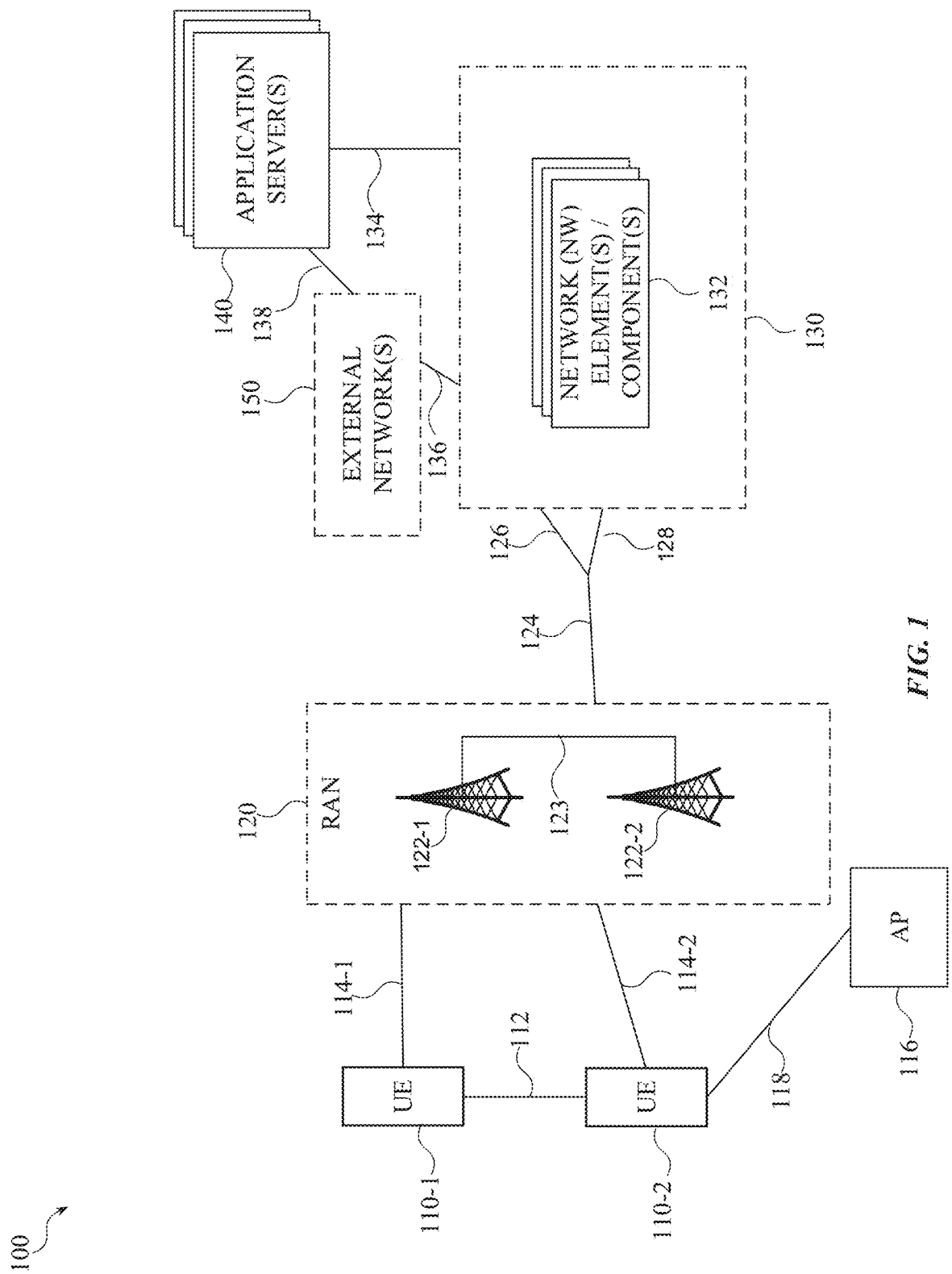
FIG. 1 illustrates an exemplary block diagram illustrating an example of user equipment(s) (UEs) communicatively coupled a network with network components as peer devices useable in connection with various embodiments (aspects) described herein.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Various aspects including a user equipment (UE) device operating in sidelink (SL) communication and selecting resources to enable SL communication are described herein. The UE device can be a pedestrian UE (P-UE) device, a vehicle-to-everything (V2X) device, or other UE that may include vehicle-to-vehicle (V2V), vehicle-to-infrastructure (V2I), vehicle-to-pedestrian (V2P) device communication, or other direct communication between UEs, which can comprise an SL communication; each transmitter and receiver can include a user equipment (UE) device. A UE when referred to herein can also further include a Roadside Unit (RSU), a drone, other vehicle device, Internet of Things (IoT) device, or other user equipment device, for example.

Different types of communications are considered in new radio (NR)-V2X devices or V-UEs to fulfill requirements of many use cases for vehicle networks, including operation in NR unlicensed networks. The use cases may involve different types of communication types, including V2V, V2I, V2P, V2N, or the like. Also, V2X communication for improved road safety, increased traffic efficiency or infotainment could take place in any one of a following network coverage scenarios: 1) in-coverage, when the communicating UEs on SL (e.g., P-UEs or vehicle UEs (V-UEs)) are located with the coverage of a base station (e.g., new radio gNB); 2) out-of-coverage, when all communication UEs are out of coverage of any base station or gNB; and 3) partial-coverage, when at least one of the communication UEs is in-coverage and communicatively coupled to a base station or gNB.

In particular, when configuring a dedicated sidelink (SL) channel between UEs (e.g., V2X/V-UEs, or other UEs) in an out-of-coverage scenario or in an unlicensed NR network, an initiating/initiator V2X device (also referred to as a UE herein) senses the SL channel to determine whether it is busy or not, and upon acquiring the SL channel communication provides sidelink control information (SCI) in two stages. The first stage SCI is carried on a physical sidelink control channel (PSCCH) and comprises information to enable sensing operations on the acquired SL channel, as well as information about the resource allocation. A physical sidelink shared channel (PSSCH) transmits the second stage SCI and an SL shared transport channel. The second stage SCI carries information to enable identification and decoding of the SL channel, as well as control for Hybrid Automatic Repeat Request (HARQ) procedures, triggering for channel state information (CSI) feedback, or related information. The SL shared channel carries the transport block (TB) of data for transmission over the SL channel. The SCI includes information for the correct reception of the TB. Thus, various aspects being described enable and ensure that the TB of data in SL transmission by a receiving UE in an unlicensed NR network is decoded properly and the associated SCI is received correctly in SL communications.

In an aspect, additional SCI information can be configured in the SCI for an initiating UE to provide to a receiving UE for SL communication in unlicensed NR networks. For example, various clear channel assessment (CCA) related fields can be provided in the SCI so that when channel occupancy time (COT) sharing is being signaled, the receiving UE performs a CCA that is shorter than a complete/full CCA (e.g., a category 4 (CCA)). By performing a shorter CCA, such as a single/one shot CCA, for example, the SL communications between paired V2X devices or other UEs can be efficiently maintained.

In an aspect, the initiating UE that senses and acquires a COT for SL communication with a receiving UE in the unlicensed NR network can provide COT related signaling in the stage 1 SCI that enables the receiving UE to share COT resources with the initiating UE. To this end, the initiating UE can provide the first stage SCI with various additional SCI information when configuring SL communication for V2X dedicated sidelink in an unlicensed network. The first stage SCI can be configured with one or more COT indications, fields or parameters, such as an indication of a channel access priority that the initiating UE used for CAT 4 channel access. For the receiving UE sharing a sidelink unlicensed COT (SL-U COT), a same or a higher priority could be allowed for COT sharing.

Alternatively, or additionally, the one or more COT indicators can include a power indication for the power used for the CCA performed for COT sharing. As such, a shared COT transmission by a receiving UE, for example, could limit the transmission power by the CCA power.

Alternatively, or additionally, the one or more COT indications can include indications for a COT duration to be used for COT sharing. A PSSCH time allocation across multiple slots can also be an indication of the one or more COT indications.

Alternatively, or additionally, the second stage SCI or stage 2 SCI can include information for multi-slot scheduling that is related to one or more HARQ identifiers (IDs). This second stage SCI can be carried in PSSCH.

In an aspect, a baseband processor or other processor can include a memory and processing circuitry communicatively coupled to the memory that enables SL communications in a new radio (NR) unlicensed network among UE devices. The processor can be configured to generate SCI in the NR unlicensed network for transmitting to a receiving UE. The SCI includes a first stage SCI and a second stage SCI. The first stage SCI can comprise one or more COT indications that enable sharing of an SL unlicensed SL-U COT of an SL transmission. For example, if the initiating UE only uses 2 milliseconds (ms) of the acquired COT and a total COT duration is 8 ms, then the receiving UE could potentially utilize a remaining 6 ms of the shared COT based on the COT indications provided to it by the initiating UE and related to the SL-U COT for COT sharing in SL communication over an NR unlicensed network. The one or more COT indications can comprise one or more of: a channel access priority indication, a power indication, a COT duration, a clear channel assessment (CCA) type, a cyclic prefix (CP) extension, a PSSCH frequency domain resource allocation, or a periodicity X indication that indicates one or more slots of the PSSCH comprising the second stage SCI, for example, in which X is an integer.

FIG. 1 is an example network 100 according to one or more implementations described herein. Example network 100 may include UEs 110-1, 110-2, etc. (referred to collectively as "UEs 110" and individually as "UE 110"), a radio access network (RAN) 120, a core network (CN) 130, application servers 140, external networks 150, or other components.

The systems and devices of example network 100 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 100 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 110 may include smartphones (e.g., handheld touchscreen mobile computing devices connectable to one or more wireless communication networks). Additionally, or alternatively, UEs 110 may include other types of mobile or non-mobile computing devices capable of wireless communications, such as personal data assistants (PDAs), pagers, laptop computers, desktop computers, wireless handsets, etc. In some implementations, UEs 110 may include internet of things (IoT) devices (or IoT UEs), smart glass over extended reality (XR), as well as vehicle UEs or vehicle device entities, including Vehicle to Everything (V2X) devices, Vehicle to Vehicle (V2V), Vehicle to Infrastructure (V2I) and Vehicle to Pedestrian (V2P) devices or the like. Vehicle device entities can also include a road side unit (RSU), which is an entity that supports V2I and is implemented in an eNodeB or a stationary/non-stationary UE/IoT including any one or more components/circuitry described herein. Such UEs may comprise a network access layer designed for low-power applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 110 may communicate and establish a connection with (e.g., be communicatively coupled) with RAN 120, which may involve one or more wireless channels 114-1 and 114-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 122-1 and 122-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 130. Additionally, at least one of the MN or the SN may be operated with shared spectrum channel access, and functions specified for UE 110 can be used for an integrated access and backhaul mobile termination (IAB-MT). Similar for UE 110, the IAB-MT may access the network using either one network node or using two different nodes with enhanced dual connectivity (EN-DC) architectures, new radio dual connectivity (NR-DC) architectures, or other direct connectivity such as a sidelink communication channel as an SL interface 112.

The NR SL physical layer of the SL interface 112 can be comprised of several physical channels and signals. The SL physical channels are a set of resource elements carrying information of higher layers of the protocol stack. The SL physical channels can include a Physical Sidelink Broadcast Channel (PSBCH) that carries the SL-BCH transport channel where a Master Information Block (MIB) for SL is sent periodically (each 160 ms) and comprises system information for UE-to-UE communication (e.g., SL TDD configuration, in-coverage flag). PSBCH is transmitted along with the Sidelink Primary Synchronization Signal/Sidelink Secondary Synchronization Signal (S-PSS/SSS) in the S-SSB. The SL physical channels can further include a Physical Sidelink Feedback Channel (PSFCH) used to transmit the HARQ feedback from a receiver UE to the transmitter UE (or initiating UE) on the SL for a unicast or groupcast communication. A Physical Sidelink Shared Channel (PSSCH) and Physical Sidelink Control Channel (PSCCH) can be configured so that every PSSCH, which contains transport blocks (i.e., user data traffic), is associated with a PSCCH. The PSCCH can be transmitted on the same slot as PSSCH and contains control information about the shared channel.

In some implementations, a base station (as described herein) may be an example of network node 122. As shown, UE 110 may also, or alternatively, connect to access point (AP) 116 via connection interface 118, which may include an air interface enabling UE 110 to communicatively couple with AP 116. AP 116 may comprise a wireless local area network (WLAN), WLAN node, WLAN termination point, etc. The connection 1207 may comprise a local wireless connection, such as a connection consistent with any IEEE 702.11 protocol, and AP 116 may comprise a wireless fidelity (Wi-Fi®) router or other AP. While not explicitly depicted in FIG. 1, AP 116 may be connected to another network (e.g., the Internet) without connecting to RAN 120 or CN 130. In some scenarios, UE 110, RAN 120, and AP 116 may be configured to utilize LTE-WLAN aggregation (LWA) techniques or LTE WLAN radio level integration with IPsec tunnel (LWIP) techniques. LWA may involve UE 110 in RRC_CONNECTED being configured by RAN 120 to utilize radio resources of LTE and WLAN. LWIP may involve UE 110 using WLAN radio resources (e.g., connection interface 118) via IPsec protocol tunneling to authenticate and encrypt packets (e.g., Internet Protocol (IP) packets) communicated via connection interface 118. IPsec tunneling may include encapsulating the entirety of original IP packets and adding a new packet header, thereby protecting the original header of the IP packets.

RAN 120 may include one or more RAN nodes 122-1 and 122-2 (referred to collectively as RAN nodes 122, and individually as RAN node 122) that enable channels 114-1 and 114-2 to be established between UEs 110 and RAN 120. RAN nodes 122 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 122 may include a roadside unit (RSU), a transmission reception point (TRxP or TRP), and one or more other types of ground stations (e.g., terrestrial access points). In some scenarios, RAN node 122 may be a dedicated physical device, such as a macrocell base station, and/or a low power (LP) base station for providing femtocells, picocells or other like having smaller coverage areas, smaller user capacity, or higher bandwidth compared to macrocells.

Any of the RAN nodes 122 may terminate an air interface protocol and may be the first point of contact for UEs 110. In some implementations, any of the RAN nodes 122 may fulfill various logical functions for the RAN 120 including, but not limited to, radio network controller (RNC) functions such as radio bearer management, uplink and downlink dynamic radio resource management and data packet scheduling, and mobility management. UEs 110 may be configured to communicate using orthogonal frequency-division multiplexing (OFDM) communication signals with each other or with any of the RAN nodes 122 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 122 to UEs 110, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 122 may be configured to wirelessly communicate with UEs 110, and/or one another, over a licensed medium (also referred to as the "licensed spectrum" and/or the "licensed band"), an unlicensed shared medium (also referred to as the "unlicensed spectrum" and/or the "unlicensed band"), or combination thereof. A licensed spectrum may include channels that operate in a frequency range (e.g., approximately 400 MHz to approximately 3.8 GHz, or otherwise), whereas the unlicensed spectrum may include the 5 GHz band or higher, for example. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 110 and the RAN nodes 122 may operate using NR unlicensed (NR-U), licensed assisted access (LAA), eLAA, and/or feLAA mechanisms. In these implementations, UEs 110 and the RAN nodes 122 may perform one or more known medium sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol or a clear channel assessment (CCA).

In NR-U, channel access in both downlink and uplink rely on LBT or CCA feature. A wireless device or a base station first "senses", as part of sensing operations discussed herein, the communications channel to determine whether there is no communications prior to any transmission or a reservation by another UE is on a potential resource, or a candidate resource. When a communication channel is a wide bandwidth unlicensed carrier (e.g., several hundred MHz), the "channel sensing" procedure relies on detecting the energy level on multiple sub-bands of the communications channel. The LBT/CCA parameters (such as type/duration, clear channel assessment parameters, etc.) are configured in a wireless device by the base station.

NR supports dynamic TDD, where the uplink-downlink allocation may change over time to adapt to traffic conditions. To enable dynamic TDD, a wireless device determines when and where to transmit and receive based on an indication of a channel occupancy time or COT structure. The COT can comprise multiple slots and each slot comprises downlink resources, uplink resources, or flexible resources. The COT structure reduces power consumption and channel access delay.

The NR-U or LA mechanisms may be built upon carrier aggregation (CA) technologies of wireless or LTE-Advanced systems, respectively. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different path loss. A primary service cell or PCell may provide a primary component carrier (PCC) for both UL and DL and may handle RRC and non-access stratum (NAS) related activities. The other serving cells are referred to as SCells, and each SCell may provide an individual secondary component carrier (SCC) for both UL and DL. The SCCs may be added and removed as required, while changing the PCC may require UE 110 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH may carry user data and higher layer signaling to UEs 110. The physical downlink control channel (PDCCH) may carry information about the transport format and resource allocations related to the PDSCH channel, among other things. The PDCCH may also inform UEs 110 about the transport format, resource allocation, and hybrid automatic repeat request (HARQ) information related to the uplink shared channel. Typically, downlink scheduling (e.g., assigning control and shared channel resource blocks to UE 110-2 within a cell) may be performed at any of the RAN nodes 122 based on channel quality information fed back from any of UEs 110. The downlink resource assignment information may be sent on the PDCCH used for (e.g., assigned to) each of UEs 110.

The PDCCH uses control channel elements (CCEs) to convey the control information, wherein a number of CCEs (e.g., 6 or the like) may consists of a resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition. There may be four or more different PDCCH formats defined in LTE with different numbers of CCEs (e.g., aggregation level, L=1, 2, 4, 8, or 16).

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as EREGs. An ECCE may have other numbers of EREGs in some situations.

The RAN nodes 122 may be configured to communicate with one another via interface 123. In implementations where the system is an LTE system, interface 123 may be an X2 interface. The X2 interface may be defined between two or more RAN nodes 122 (e.g., two or more eNBs/gNBs or a combination thereof) that connect to evolved packet core (EPC) or CN 130, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to a secondary eNB (SeNB); information about successful in sequence delivery of PDCP packet data units (PDUs) to a UE 110 from an SeNB for user data; information of PDCP PDUs that were not delivered to a UE 110; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality.

As shown, RAN 120 may be connected (e.g., communicatively coupled) to CN 130 via a Next Generation (NG) interface 124. The NG interface 124 can be split into two parts, a Next Generation (NG) user plane (NG-U) interface 128, which carries traffic data between the RAN nodes 122 and a User Plane Function (UPF), and the S1 control plane (NG-C) interface 126, which is a signaling interface between the RAN nodes 122 and Access and Mobility Management Functions (AMFs). The Core network CN 130 can also be a 5G core network (5GC) 220.

CN 130 may comprise a plurality of network elements 132, which are configured to offer various data and telecommunications services to customers/subscribers (e.g., users of UEs 110) who are connected to the CN 130 via the RAN 120. In some implementations, CN 130 may include an evolved packet core (EPC), a 5G CN, and/or one or more additional or alternative types of CNs. The components of the CN 130 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 130 may be referred to as a network slice, and a logical instantiation of a portion of the CN 130 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 130, application servers 140, and external networks 150 may be connected to one another via interfaces 134, 136, and 138, which may include IP network interfaces. Application servers 140 may include one or more server devices or network elements (e.g., virtual network functions (VNFs) offering applications that use IP bearer resources with CM 130 (e.g., universal mobile telecommunications system packet services (UMTS PS) domain, LTE PS data services, etc.). Application servers 140 may also, or alternatively, be configured to support one or more communication services (e.g., voice over IP (VoIP) sessions, push-to-talk (PTT) sessions, group communication sessions, social networking services, etc.) for UEs 110 via the CN 130. Similarly, external networks 150 may include one or more of a variety of networks, including the Internet, thereby providing the mobile communication network and UEs 110 of the network access to a variety of additional services, information, interconnectivity, and other network features.

Figure 2:
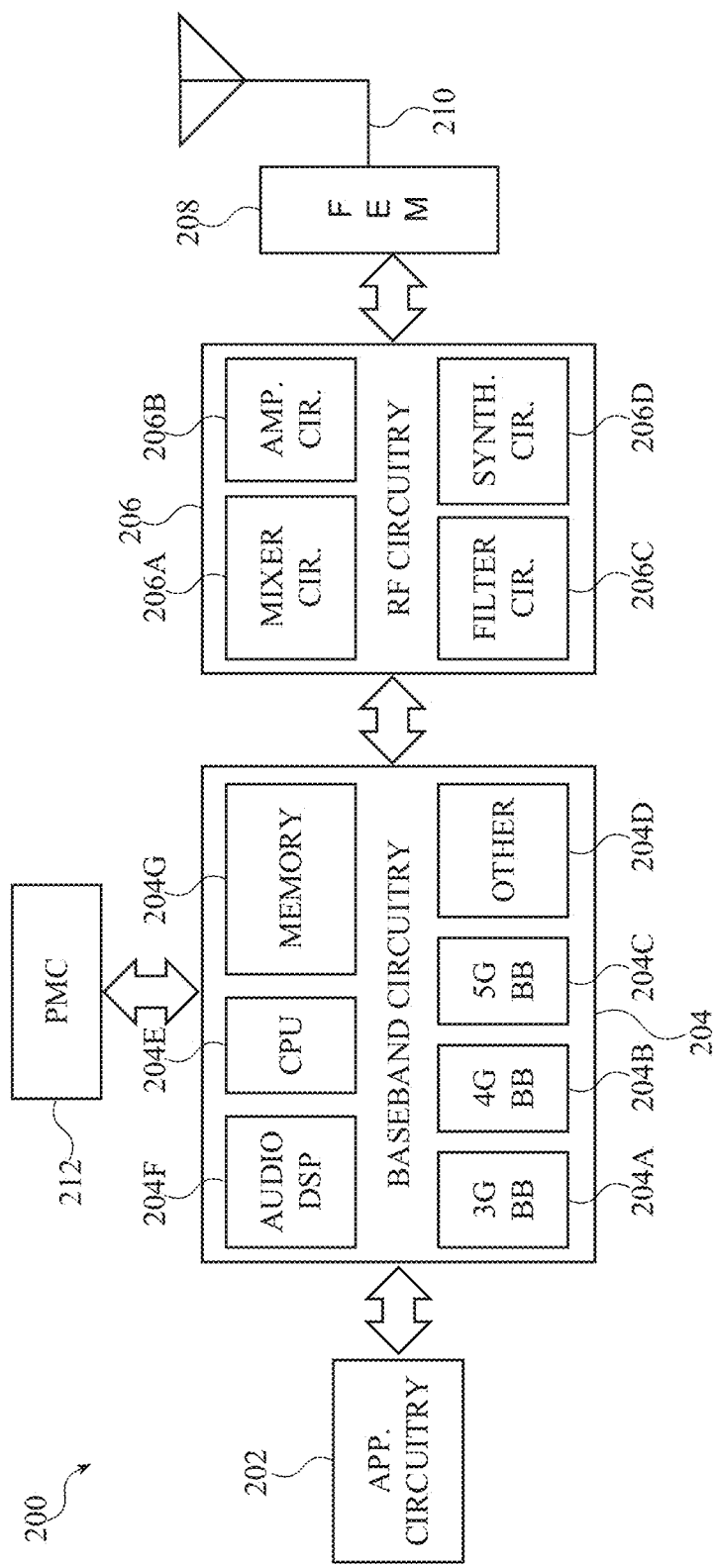
FIG. 2 illustrates a diagram illustrating example components of a device that can be employed in accordance with various aspects discussed herein.

FIG. 2 illustrates example components of a device 200 in accordance with some aspects. In some aspects, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node. In some aspects, the device 200 can include fewer elements (e.g., a RAN node cannot utilize application circuitry 202, and instead include a processor/controller to process IP data received from a CN such as 5GC 120 or an Evolved Packet Core (EPC)). In some aspects, the device 200 can include additional elements such as, for example, memory/storage, display, camera, sensor (including one or more temperature sensors, such as a single temperature sensor, a plurality of temperature sensors at different locations in device 200, etc.), or input/output (I/O) interface. In other aspects, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some aspects, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband circuity 204 can interface with the application circuitry 202 for generation and processing of the baseband signals and for controlling operations of the RF circuitry 206. For example, in some aspects, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other aspects, some, or all of the functionality of baseband processors 204A-D can be included in modules stored in the memory 204G and executed via a Central Processing Unit 204E. Memory 204G can include executable components or instructions to cause one or more processors (e.g., baseband circuitry 204) to perform aspects, processes or operations herein. The radio control functions can include, but are not limited to, signal modulation/demodulation, encoding/decoding, radio frequency shifting, etc. In some aspects, modulation/demodulation circuitry of the baseband circuitry 204 can include Fast-Fourier Transform (FFT), precoding, or constellation mapping/demapping functionality. In some aspects, encoding/decoding circuitry of the baseband circuitry 204 can include convolution, tail-biting convolution, turbo, Viterbi, or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 204 can include one or more audio digital signal processor(s) (DSP) 204F. The audio DSP(s) 204F can include elements for compression/decompression and echo cancellation and can include other suitable processing elements in other aspects. Components of the baseband circuitry can be suitably combined in a single chip, a single chipset, or disposed on a same circuit board in some aspects. In some aspects, some, or all of the constituent components of the baseband circuitry 204 and the application circuitry 202 can be implemented together such as, for example, on a system on a chip (SOC).

In some aspects, the baseband circuitry 204 can provide for communication compatible with one or more radio technologies. For example, in some aspects, the baseband circuitry 204 can support communication with a NG-RAN, an evolved universal terrestrial radio access network (EU-TRAN) or other wireless metropolitan area networks (WMAN), a wireless local area network (WLAN), a wireless personal area network (WPAN), etc. Aspects in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various aspects, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some aspects, the receive signal path of the RF circuitry 206 can include mixer circuitry 206a, amplifier circuitry 206b and filter circuitry 206c. In some aspects, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some aspects, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some aspects, the output baseband signals can be zero-frequency baseband signals, although this is not a requirement. In some aspects, mixer circuitry 206a of the receive signal path can comprise passive mixers, although the scope of the aspects is not limited in this respect.

In aspects, any one or more of baseband processors 204A thru 204F as processing circuitry of baseband circuitry 204, along or integrated in combination, can be configured to process or generate SCI in a transmitting UE (e.g., 110-1) and for a receiving UE (e.g., 110-2). RF receiving circuitry can further operate to transmit and receive data from baseband circuitry to or from antenna 210 and FEM 208 such as the SCI. The SCI comprises a first stage SCI and a second stage SCI, in which at least one of: the first stage SCI or the second stage SCI comprises one or more COT indications that enable sharing of an SL unlicensed SL-U COT. For example, the first stage SCI can be provided on PSCCH and the second stage SCI on PSSCH in the SL transmission.

Figure 3:
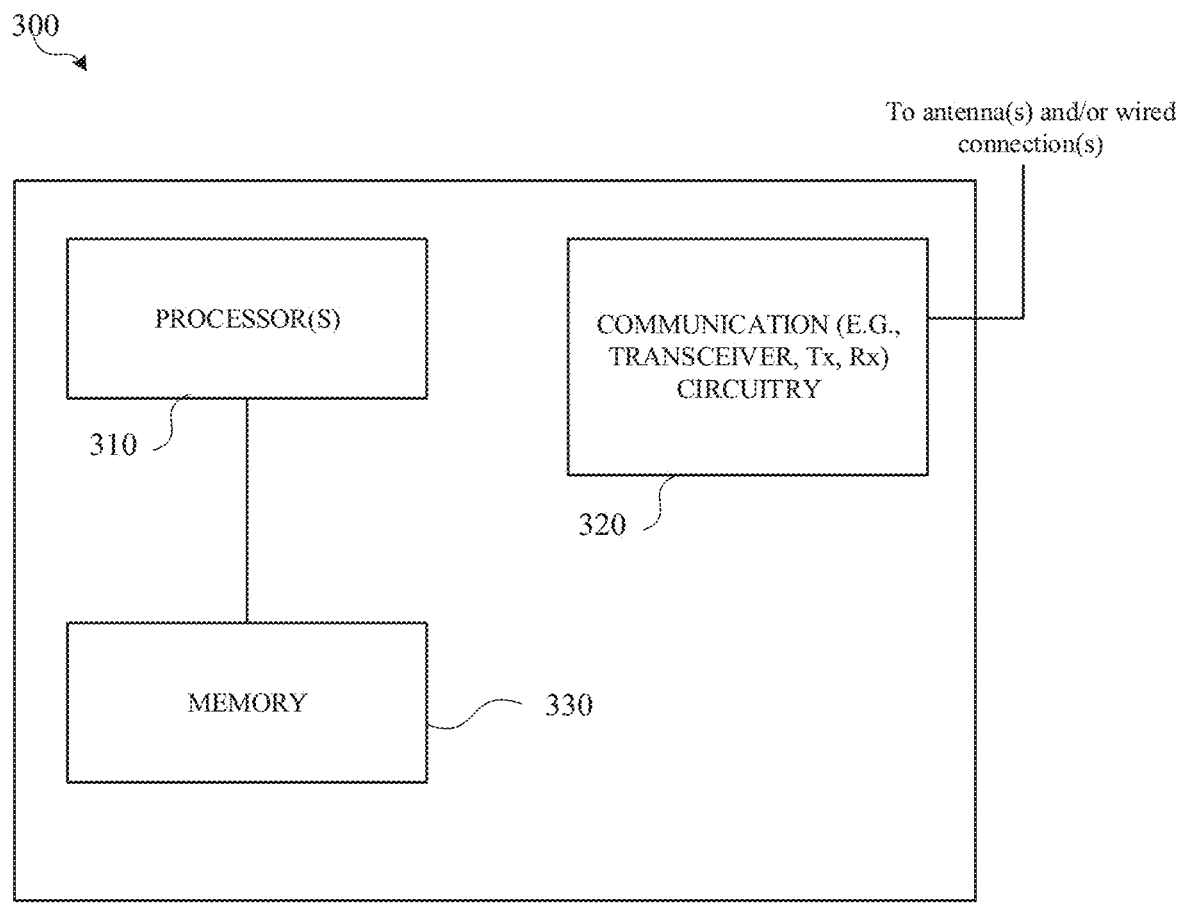
FIG. 3 illustrates an example simplified block diagram of a user equipment (UE) wireless communication device or other network device/component (e.g., eNB, gNB) in accordance with various aspects.

Referring to FIG. 3, illustrated is a block diagram of a user equipment (UE) device or another network device/component (e.g., V-UE/P-UE, IoT, base station (e.g., gNB, eNB, or the like), or other participating network entity/component). The device 300 includes one or more processors 310 (e.g., one or more baseband processors) comprising processing circuitry and associated interface(s), transceiver circuitry 320 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 330 (which can comprise any of a variety of storage mediums and can store instructions and/or data associated with one or more of processor(s) 310 or transceiver circuitry 320).

Memory 330 (as well as other memory components discussed herein, e.g., memory, data storage, or the like) can comprise one or more machine-readable medium/media including instructions that, when performed by a machine or component herein cause the machine or other device to perform acts of a method, an apparatus or system for communication using multiple communication technologies according to aspects, embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium.

Memory 330 can include executable instructions, and be integrated in, or communicatively coupled to, processor or processing circuitry 310. The executable instructions of the memory 330 can cause processing circuitry 310 receive or generate SCI in an NR unlicensed network. The SCI comprises a first stage SCI on a physical shared control channel (PSCCH) and a second stage SCI on a physical sidelink shared channel (PSSCH). The first stage SCI or the second stage SCI can include COT indications that enable a sharing of an SL unlicensed (SL-U COT) acquired on an SL channel. The second stage SCI can include multiple slots of the PSSCH with different HARQ process Identifiers (HARQ IDs) corresponding to the multiple slots, respectively, or a same HARQ process ID for each slot. Communication and transceiver circuitry 320 can further transmit an SL transmission on the SL-U COT based on the one or more COT indications.

In an aspect, the UE/gNB device 300 can operate to configure by processing/generating/encoding/decoding a physical (PHY) layer transmission to/from a higher layer (e.g., MAC layer), comprising multiple different transport blocks (TBs) based on an unequal protection between the different TBs in a physical layer encapsulation (e.g., EPC packets, a transmission opportunity, maximum channel occupancy time (MCOT), a single transmission burst, a TTI or other encapsulation protocol or related encapsulation parameter(s) for the encapsulation of data from higher layers into frames for transmission over the air. The physical (PHY) layer transmission can be received, transmitted, or provided with communication/transmitter circuitry 320 to similarly process/generate the physical layer transmission with spatial layers via a physical channel in an NR network or other networks.

Processor(s) 310 can be components of application/processing circuitry or processor(s) of the baseband circuitry that can be used to execute components or elements of one or more instances of a protocol stack. For example, processor(s) 310 of baseband circuitry, alone or in combination, as processing circuitry, can be configured, in an aspect, to generate and transmit SCI in an NR unlicensed network. The SCI can include a first stage SCI (SCI stage 1) and a second stage SCI (SCI stage 2). The first stage SCI can include indications for COT sharing with a receiving UE for SL communications on a dedicated SL V2X channel over the NR unlicensed network. These indications can be one or more COT indications that enable sharing of an SL unlicensed COT (SL-U COT) of an SL transmission. The first stage SCI can be provided on PSCCH and the second stage SCI on a physical sidelink shared channel (PSSCH). The one or more COT indications can include one or more of: a channel access priority indication, a power indication, a COT duration, a clear channel assessment (CCA) type, a cyclic prefix (CP) extension, a PSSCH frequency domain resource allocation, or a periodicity X indication that indicates one or more slots of the PSSCH comprising the second stage SCI.

Figure 4:
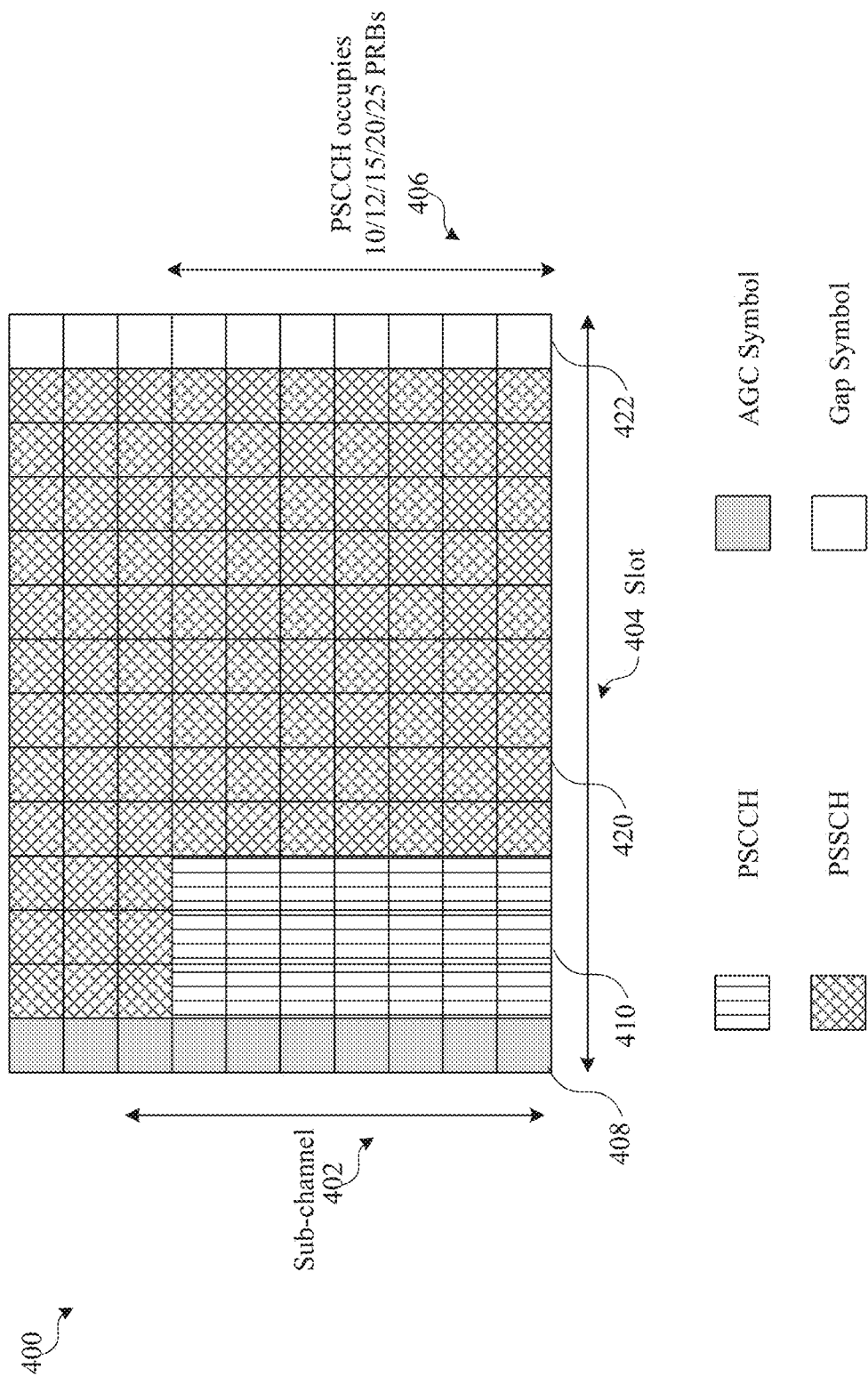
FIG. 4 illustrates an example of sidelink (SL) communication for channel occupancy time (COT) sharing in a new radio (NR) unlicensed network in accordance with various aspects.

Referring to FIG. 4, illustrated is an example of an SL slot configured with SCI (e.g., V2X SCI) for SL communications 400 in an NR unlicensed network between an initiating UE (e.g., 110-1) and a receiving UE (e.g., 110-2) in accord with various aspects. As noted herein, SL communication refers to direct communication between two or more nearby V2X devices or UEs without traversing a network node or base station. The SL slot 404 includes 14 symbols that each include resource blocks spanning the vertical axis of each sub-channel 402. Some symbols include PSCCH 410 and PSSCH 420, in which PSSCH 420 can occupy up to 10 physical resource blocks (PRBs) 406, as illustrated, or alternatively, up to 12, 15, 20, 25, etc. PRBs. The SL slot 404 includes resources with PSCCH 410 and PSSCH 420, as well as an automatic gain control (AGC) symbol as a first symbol 408 and a gap symbol. The SL slot 404 can be configured with more or less symbols, and be transmitted in a smaller or large time block, for example, in other applications.

The SL slot 404 includes a first symbol 408 comprising the AGC symbol 408, which can be a copy of the second symbol. Following symbols include a first stage SCI or stage 1 SCI on PSCCH 410 that contains information to enable sensing operations, as well as information about the resource allocation of the PSSCH. The SCI (e.g., SCI Format 1A) can include stage 1 or first stage SCI on PSCCH 410 with various information for sensing and resource mapping, which can include a priority (comprising, e.g., 3 bits), a PSSCH frequency resource assignment, a PSSCH time resource assignment, a resource reservation period (comprising, e.g., 0-4 bits), a demodulation reference signal (DMRS) pattern (comprising, e.g., 0-2 bits), an SCI stage 2 format (comprising, e.g., 2 bits), a beta_offset indicator (comprising, e.g., 2 bits), a number of DRMS ports (comprising, e.g., 1 bit), a modulation and coding scheme (MCS) (comprising, e.g., 5 bits), an MCS table index (e.g., 0-2 bits), a physical sidelink feedback channel (PSFCH) overhead indication (comprising, e.g., 1 bit), for power control, and reserved bits (comprising, e.g., 2-4 bits). The first stage SCI can include a single stage 1 format per resource pool, the content of which indicates control of signaling on the PSSCH 420.

In an aspect, the first stage SCI is configured to include indications (fields or parameters) to enable COT sharing. COT sharing can be enabled on an SL-U COT when the initiating UE has acquired the SL channel and is able to share remaining resources that are not being used after a SL transmission with another receiving UE. In turn, the receiving UE uses similar resources as indicated by the initiating UE to transmit over the SL channel for SL V2X dedicated communication on an NR unlicensed network.

The SL slot 404 further includes the second stage SCI on PSSCH 420, which can be multiplexed with the PSCCH 410. The second stage SCI carries information for the receiving UE to identify and decode the associated SL channel, as well as control for HARQ procedures, and triggers for CSI feedback and the like. The SL shared channel carries the TBs of data for transmission over SL. The second stage SCI (e.g., including SCI stage 2 format 2-A) can be configured with HARQ operation when HARQ-ACK information includes acknowledgement (ACK) or non-acknowledgement (NACK), when HARQ-ACK information includes only NACK, or when there is no feedback of HARQ-ACK information. This second stage SCI on PSSCH 420 can include a HARQ process number (comprising, e.g., 4 bits), a new data indicator (comprising, e.g., 1 bit), a redundancy version (comprising, e.g., 2 bits), a source ID (comprising, e.g., 8 bits), a destination ID (comprising, e.g., 16 bits), a HARQ feedback enabling/disabling indicator (comprising, e.g., 1 bit), a cast type indicator (comprising, e.g., 2 bits), and CSI request (comprising, e.g., 1 bit).

The second stage SCI (e.g., including SCI stage 2 format 2-B) portion can include HARQ operation when HARQ-ACK information includes only NACK, or when there is no feedback of HARQ-ACK information. Information can include a HARQ process number, a new data indicator (comprising, e.g., 1 bit), a redundancy version (comprising, e.g., 2 bits), a source ID (comprising, e.g., 8 bits); a destination ID (comprising, e.g., 16 bits), a HARQ feedback enabling/disabling indicator (comprising, e.g., 1 bit), a Zone ID (comprising, e.g., 12 bits), and a communication range requirement (comprising, e.g., 4 bits). The resource mapping of stage 2 SCI carried on PSSCH 420 can be configured in a frequency-first, time-second mapping.

The last symbol in the SL slot 400 is a gap symbol 422, not transmitted by the transmitter. The gap symbol 422 can be used to allow some time for a transmitter to receive (Tx-to-Rx) turnaround.

Figure 5:
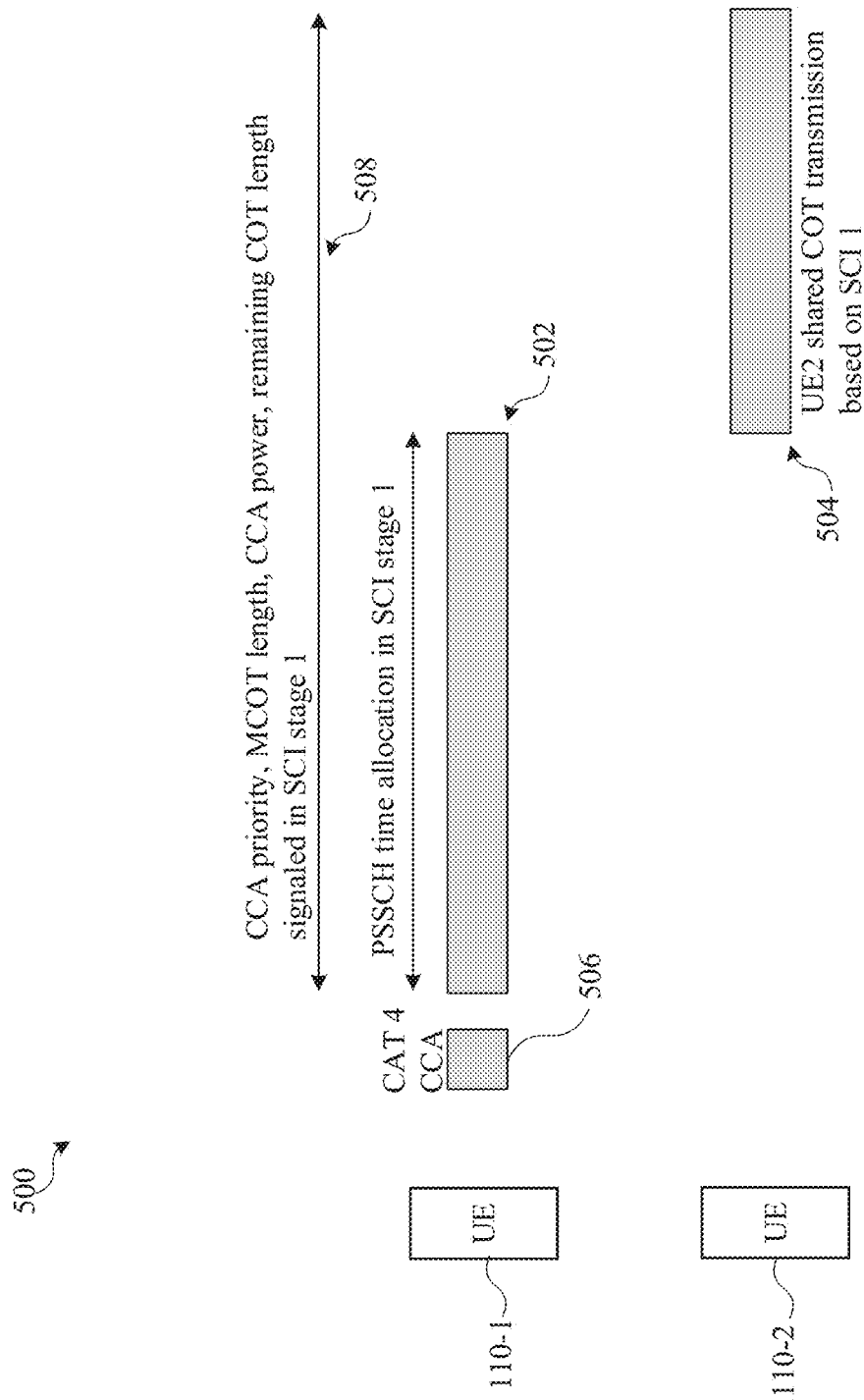
FIG. 5 illustrates another example SL communication for COT sharing in an NR unlicensed network in accordance with various aspects.

FIG. 5 illustrates an example SL communication environment in accord with aspects herein. An initiating UE 110-1 and a receiving UE 110-2 can be V-UEs communicating in an NR unlicensed network via SL communications dedicated to V2X SL. The initiating UE 110-1 acquires a COT 508 for SL communication by performing a full clear channel assessment (CCA) or a category (CAT) 4 CCA 506 to sense the SL channel. If the channel is not busy, the initiating UE 110-1 acquires the COT and transmits the SCI to provide a PSSCH time allocation with related CCA indications in a first stage SCI 502 to the receiving UE 110-2. The SCI can include any COT indications for sharing of the COT when resources remain for sharing after SL transmission(s) by the initiating UE 110-1. When the COT 508 is able to be shared by the UE 110-1, such as when resources remain after UE 110-1 initially acquires the COT, indications of the COT can be provided with the SCI from SCI 110-1. The receiving UE 110-2 decodes the SCI and generates SL transmission 504 on resources for SL communication on the COT 508 according the COT indications obtained with the decoded SCI.

The COT 508 can be used for SL communication between the UE 110-1 and 110-2 on NR unlicensed networks. The COT 508 is used for the SL communication by the receiving UE 110-2 as an SL-U COT based on the COT indications for COT sharing. The COT indications can include fields or parameters that enable COT sharing in the first stage SCI 502. These can include a channel access priority indication, a power indication, a COT duration, a clear channel assessment (CCA) type, a cyclic prefix (CP) extension, a PSSCH frequency domain resource allocation, or a periodicity X indication that indicates one or more slots of the PSSCH comprising the second stage SCI.

Although the COT indications are illustrated and described, for example, as being generated/received as a part of the first stage SCI, any one or more COT indications described herein can also be generated/received in the second stage SCI additionally, or alternatively.

In an aspect, the channel access priority indication includes a channel access priority used for the CAT 4 CCA 506 channel access. The initiating UE 110-1 provides an indication, such as a 2 bit indication, for example, as to which channel access priority is being used by the initiating UE 110-1 to acquire the SL-U COT 508 for SL transmission. In one example, this channel access priority can be based on a DL channel access priority class (DL CAPC) for SL. Alternatively, or additionally, the channel access priority can be used according to an UL CAPC.

For example, the following Table can be used by the initiating UE 110-1 for acquiring the SL-U COT 508 according to a DL CAPC.

| Channel Access Priority Class (p) | $m_p$ | $CW_{min,p}$ | $CW_{max,p}$ | $T_{cot,pm}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or | {15, 31, 63} |

-continued

| Channel Access Priority Class (p) | $m_p$ | $CW_{min,p}$ | $CW_{max,p}$ | $T_{cot,pm}$ | allowed $CW_p$ sizes |
|---|---|---|---|---|---|
| 4 | 7 | 15 | 1023 | 10 ms 8 or 10 ms | {15, 31, 63, 127, 255, 511, 1023} |

$CW_{min,p} \leq CW_p \leq CW_{max,p}$ represents the contention window size for a particular CAPC from $CW_{min,p}$ as a minimum contention window six to a maximum size $CW_{max,p}$ to enable coexistence of the SL channel in a fair manner among different devices that may want to transmit data at the same time on the SL channel with a COT. T represent a slot duration followed by mp consecutive slot durations. If a slot duration is idle, such as when the power level is detected to be less than an energy detection threshold (EDT), then the initiating UE 110-1 can acquire the COT 508; otherwise, the SL channel is considered busy and not able to be reserved for transmission, in which case the UE 110-1 could perform a random back-off procedure before performing another CCA to acquire a COT.

For CAPC of p=3 and p=4, if the absence of any other technology sharing the carrier can be guaranteed on a long term basis (e.g. by level of regulation), $T_{cot,pm}=10$ ms, otherwise, $T_{cot,pm}=8$ ms. Therefore, if the initiating UE 110-1 acquires the SL-U Cot 508 with 8 ms based on a CAPC of 3 or 4 being used and only uses a portion (e.g., 2 ms) of this duration T for SL transmission, then the remaining portion (e.g., 6 ms) could be shared with the receiving UE 110-2 for performing SL transmission with similar resources for the COT.

In an aspect, the CAPC can be configured differently, or independently, for UL and DL. For example, the following table can be utilized for UL CAPC, while the above table for DL CAPC can be used for downlink for signaling a channel access priority and in determining an EDT in an EDT adaptation procedure independently for UL and DL.

| Channel Access Priority Class (p) | mp | CWmin, p | CWmax, p | Tulmcot, p | allowed CWp sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 4, 3, Tulmcot, p = 10 ms if the higher layer parameter 'absenceOfAnyOtherTechnologyr14' indicates TRUE, otherwise, Tulmcot, p = 6 ms.
NOTE 2:
When Tulmcot, p = 6 ms it may be increased to 8 ms by inserting one or more gaps. The minimum duration of a gap shall be 100 μs. The maximum duration before including any such gap shall be 6 ms.

In an aspect, if the initiating UE 110-1 is performing channel access according to a channel access priority (p), acquires the COT 508, and able to conduct COT sharing, the UE 110-1 can indicate the priority (p) to the responding UE 110-2 to enable the receiving UE 110-2 to share the SL-U COT with a same or higher priority than the channel access priority based on a DL CAPC, an UL CAPC, or both independently. The receiving UE 110-2 can utilize the shared COT without doing a full or complete CAT 4 CCA, but rather a shorter CCA such as a one-shot CCA, for example, or other CCA (e.g., a CAT 1 CCA or CAT 2 CCA) for sensing.

Alternatively, or additionally, the receiving UE 110-2 can respond with traffic that is in the same priority or lower in priority as the DL CAPC or the UL CAPC being indicated in the SCI as a COT indication. Thus, when the COT is shared to the responding UE 110-2, the SL transmission by the receiving UE 110-2 can be limited to the traffic with equal or lower priority (where 1 is the highest priority), for example.

In an aspect, the one or more COT indications communicated by the UE 110-1 can be a power indication such as an EDT, a transmission power or both. For EDT, the UE 110-1 can dynamically determine an unlicensed EDT as an energy detection threshold adaptation procedure that can be performed based on an EDT or ED threshold level that is proportional to the UE's maximum transmit power (PH). The EDT can have an inverse proportion to the transmission power so that the more power used for SL transmission, a smaller opportunity or CCA time is used to acquire the SL channel with a tighter threshold. In other words, as the transmission power increases, an EDT decreases for SL transmission.

For a maximum transmit power PH being less than or equal to 13 dBm, the EDT can be equal to −75 dBm/MHz. For a PH that is between 13 dBm and 23 dBm, the EDT can be equal to −85 dBm/MHz+(23 dBm−$P_H$). For a PH greater than or equal to 23 dBm, then the EDT can be equal to −85 dBm/MHz.

In an example energy detection threshold adaptation procedure, the EDT ($X_{Thresh}$) can be determined independently for UL and DL. The EDT can be determined as less than or equal to a maximum EDT ($X_{Thresh\_max}$). $X_{Thresh\_max}$ can be determined according to the following representation, if the absence of any other technology sharing the channel can be guaranteed on a long-term basis (e.g. by level of regulation):

$$X_{Thresh\_max} = \min\left\{\frac{Tmax + 10db}{Xr}\right\},$$

where $X_r$ is maximum energy detection threshold defined by regulatory requirements in dBm when such requirements are defined, otherwise $X_r = T_{max} + 10$ db; otherwise:

$$X_{Thresh\_max} = \max\left\{\begin{array}{l} -72 + 10 \cdot \log 10\left(\frac{BWMHz}{20 \text{ MHz}}\right)\text{dBm}, \\ \min\left\{\begin{array}{l} Tmax, \\ Tmax - T_A + P_H + 10 \cdot \left(\frac{BWMHz}{20 \text{ MHz}}\right) - PTx \end{array}\right\} \end{array}\right\}$$

where $T_A$ is 5 dB for sidelink transmission including a synchronization signal block (SSB), otherwise is 10 dB. $P_H$ can be equal to 23 dBm. $P_{TX}$ can be a set maximum output power in dBm for the SL channel.

$$Tmax \text{ (dBm)} = 10 \cdot \log 10\left(3.6228 \cdot 10^{-8}\left(\frac{mW}{MHz}\right) \cdot BWMHz \text{ (MHz)}\right)$$

and BWMHz is a single channel bandwidth in MHz.

In an aspect, the EDT of a PSFCH can be similar to or the same as the PSSCH/PSCCH. In one example, the PSFCH utilizes a similar EDT as sidelink transmissions with an SSB, such as a secondary SSB (S-SSB), where the $T_A$ is 5 dB, for example, for SL transmission. The transmission bandwidth can be calculated or determined based on whether an interlaced waveform is used or whether a continuous waveform is used for transmission. When PSFCH is transmitted in multiple resource block (RB) sets with an interlaced waveform, the bandwidth can be set to a number of times (e.g., 20 times) the number of RB sets; otherwise, an actual bandwidth corresponding to the PSFCH can be utilized. Alternatively, or additionally, in another example, the PSFCH can utilize an EDT corresponding to sidelink transmissions without SSB (e.g., with $T_A$ being 10 dB). The bandwidth for transmission can be similarly determined based on whether an interlaced waveform is used or whether a continuous waveform is used. The transmission power of the PSFCH can be used as a variable/function in the calculation of the EDT.

The transmission power ($P_{Tx}$) indicated by the initiating UE 110-1 can be based on a definition of a maximum transmit power $P_{CMAX,f,c}$ for V2X. Alternatively, a transmission power $P_{Tx}$ can be defined based on a maximum transmit power $P_{CMAX,f,c}$ for non-V2X devices. In another alternative, the maximum transmit power can be determined by the UE 110-1 during Device-to-Device (D2D) discovery based on a path loss of one or more sidelink UE pairs for SL communication. Therefore, the maximum transmit power $P_{CMAX,f,c}$ can be defined according to energy measurements of SL UE pairs discovered within a proximity of UE 110-1, for example.

In one example, the maximum transmit power $P_{CMAX,f,c}$ can be signaled in the first stage SCI as a decibel or dB value in order to assist or enable COT sharing by the receiving UE 110-2. Alternatively, or additionally, the EDT can be signaled by a dB value (e.g., −72 dBm, −68 dBm, or other value). In an aspect, the initiating UE 110-1 utilizes the transmission power and EDT based on the parameters, values, or indications discussed herein and signaling them in COT indications for the receiving UE 110-2 to perform SL transmission with a same limitation of power as the initiating UE 110-1, or at least without a higher power than was what used to acquire the SL-U COT.

For in-network cases, or in Mode-1 SL communication where a base station (e.g., gNB or eNB) allocates usable resources for direct communication between terminals (different UEs), the base station (e.g., RAN 120, or the like) can configure and provide a UE specific radio resource control (RRC) signaling. For example, the base station can provide a sidelink-COT-sharing-EDT, which can be provided as a UE specific parameter or information element in an RRC configuration or RRC configuration information element. In this aspect, the initiating UE 110-1 can receive the EDT from the base station via RRC signaling rather than determine the EDT itself. In response to obtaining the EDT and acquiring an SL-U COT, the initiating UE 110-1 can provide the EDT as a COT indication in a first stage SCI on the PSCCH to the receiving/responding UE 110-2.

Alternatively, or additionally, the base station 120 can provide an EDT per sidelink pair for unicast signaling, or per sidelink group of V2X UEs for groupcast signaling with the sidelink-COT-sharing-EDT. In these aspects, both the UEs, UE 110-1 and 110-2 can receive the EDT and signaling of the EDT is not needed to be performed by the initiating UE 110-1 in COT indicators when signaling to share an acquired SL-U COT for SL sidelink communication with UE 110-2.

For example, if an SL transmission is 10 dBm, and the RRC configuration with the sidelink-COT-sharing-EDT uses a 23 dBm to calculate the EDT, as long as sidelink pairs, 110-1 and 110-2, transmit below 23 dBm, the restriction is being met and the initiating UE 110-1 does not necessarily need to signal the EDT dynamically to let the responding/receiving UE 110-2 know the specific energy level or EDT that it is sensing the SL channel with, thereby saving on dynamic overhead signaling.

In contrast to Mode-1 communication, Mode-2 communication is a method where the UEs select usable resources for direct communication as SL communication and can be used even when the terminals are in an out-of-coverage situation. Sensing is used for identifying resources that can be used for the sidelink, in order to decode the PSCCH during a sensing window of a certain period before performing the sidelink transmission. Regardless of in-network or out-of-network communication, the initiating UE 110-1, acquiring an SL-U COT and able to perform COT sharing in an NR unlicensed network, operates to share the COT indications to the receiving UE 110-1 for it to respond in SL communication with the SL-U COT accordingly.

In an aspect, the COT indications provided by the initiating UE 110-1 can also include a COT duration indication, which can comprise various COT duration indications. For example, the UE 110-1 can signal one or more of a total COT duration, a multiple TTI SL PSSCH COT duration, or a remaining COT length for the responding UE 110-2 to communicate on the SL-U COT acquired by the initiating UE 110-1.

The total COT duration can be determined or derived based on the priority class signaling of UE 110-1 as described herein. Otherwise, the MCOT can be signaled from the initiating UE 110-1 to the UE 110-2 absent of any priority class via one or more COT indications.

The multiple TTI SL PSSCH COT duration can be a time domain resource allocation (TDRA) that indicates how long the SL transmission is occupied within a COT duration. An NR-U TDRA table can be used for the multi-TTI allocation as the multiple TTI SL PSSCH COT duration. The NR-U TDRA table can be based on, for example, a Rel-16 or beyond NR-U TDRA table, which can indicate a number of repetitions or TTIs being used for SL transmission with the SCI. The SL transmissions between the UE SL pair can be continuous to avoid additional CCAs for acquiring the SL-U COT being shared. A total length of the multiple TTI SL PSSCH COT duration can indicate the initiation UE SL transmission within the COT or a number of slots in a multiple slot transmission.

The remaining COT length indication can be used to indicate the COT length that is being shared and provided to the receiving UE 110-2. This is the time that the responding UE 110-2 can occupy to respond to UE 110-1 in SL transmission over the SL-U COT. In an aspect, the remaining COT length can be derived by the receiving UE 110-2 by subtracting an initiating transmission COT length from the MCOT. As such, if two of the COT indications related to COT duration (e.g., MCOT, initiating SL transmission, SL transmission of the SCI, etc.) are obtained from the COT indications in the SCI, then the responding UE 110-2 can derive the remaining COT length for SL transmission. For example, if the MCOT is 8 ms and the initiating UE 110-1 transmits for 2 ms, then the responding UE 110-2 can transmit with a remaining COT length of 6 ms. All three parameters could be signaled as COT indications in the SCI for redundancy or any two can be signaled for deriving a third parameter, for example.

In an aspect, the COT indications can further include an indication of a CCA type and a frequency domain resource allocation (FDRA). The CCA indication can comprise a CCA type and a cyclic prefix (CP) extension to ensure that the receiving UE 110-2 is sharing the COT with the initiating UE 110-1. For example, the COT indication can include a type of CCA that the receiving UE 110-2 can use for sensing the SL channel (e.g., a one shot CCA (e.g., 24 microseconds) or other CCA). The CCA and CP extension indications can inform the receiving UE 110-2 that the transmission time is within a certain time (e.g., 60 microseconds, or the like) of the finish of the initiating UE 110-1 transmission. In one example, V2X UEs (e.g., 110-1 and 110-2) in SL communication over an NR unlicensed network can use up to six bits in a table specified for CP extension and CCA sensing in joint signaling. For example, in one alternative, up to six bits in a first stage SCI can indicate different combinations of CCA and CP extension for responding UEs to perform SL communication on an acquired COT being shared.

The COT indications can also include an FDRA indication that indicates an interlace for SL transmission. For example, a PSSCH FDRA bit field or a bitmap can indicate that an interlace or interlace type is being used for sidelink communication. NR supports both contiguous and interlaced uplink resource allocation. The interlaced resource allocation is a basic unit of resource allocation for NR unlicensed channels, which, for example, can be composed of ten equally spaced resources blocks within a 20 MHz frequency bandwidth for 15 KHz sub-carried spacing.

In other aspects, the second stage SCI or stage 2 SCI can be transmitted across multiple slots of PSSCH. HARQ information can be provided for stage 2 SCI. The HARQ ID or HARQ process ID for each slot can be signaled in stage 2 SCI when configuring multiple slots of PSSCH. In one example, a HARQ ID for the first slot only could be signaled in the second stage SCI, and the HARQ ID for any subsequent slot could be derived from the HARQ ID of the first slot (e.g., adding +1, or the like). Alternatively, or additionally, a new bit indicator can be used for each HARQ ID to identify the HARQ IDs of each slot.

Regarding the redundancy version per HARQ ID, 2 bits can be used per HARQ retransmission to identify the HARQ ID being retransmitted regardless of whether a single TTI transmission or multiple TTI transmission is being generated. For example, if the transmission is over one TTI, then 2 bits can be added; if 2 TTIs, then 4 bits are used; if 3 TTIs, then 6 bits, and so on. Alternatively, or additionally, two bits can be used to a signal per single TTI, with one bit being used additionally for multiple TTIs. For example if one TTI is being signaled, then 2 bits can be used to identify the redundancy version HARQ ID; if two TTIs, then 2 bits (with 1 bit per HARQ); if three TTIs are signaled, then 3 bits can be used, and so on. When one bit is being used, the redundancy version indication is indexed from 0 and 2. When two bits are used, the redundancy indication can be 0, 1, 2, 4, for example.

Alternatively or additionally, with SCI configured with multiple slot PSSCH, the second stage SCI can be transmitted in each slot and used to provide an indication of the data in the corresponding slot. This can have more reliability compared to transmitting the PSSCH over more than one slot (e.g., an average of 4 slots, or other number of slots) for stage 2 SCI. For repetition based operations with the second stage SCI being repeated, the same HARQ process ID can be indicated for each slot. For multiple transport block (TB) based operations, different HARQ process IDs can be indicated for each slot.

Alternatively, or additionally, the second stage SCI can be transmitted according to a periodicity X. For example, second stage SCI can be transmitted in every X slot to support TBs over X slots, where the periodicity X can be indicated by stage 1 SCI as a part of the COT indications or otherwise.

Figure 6:
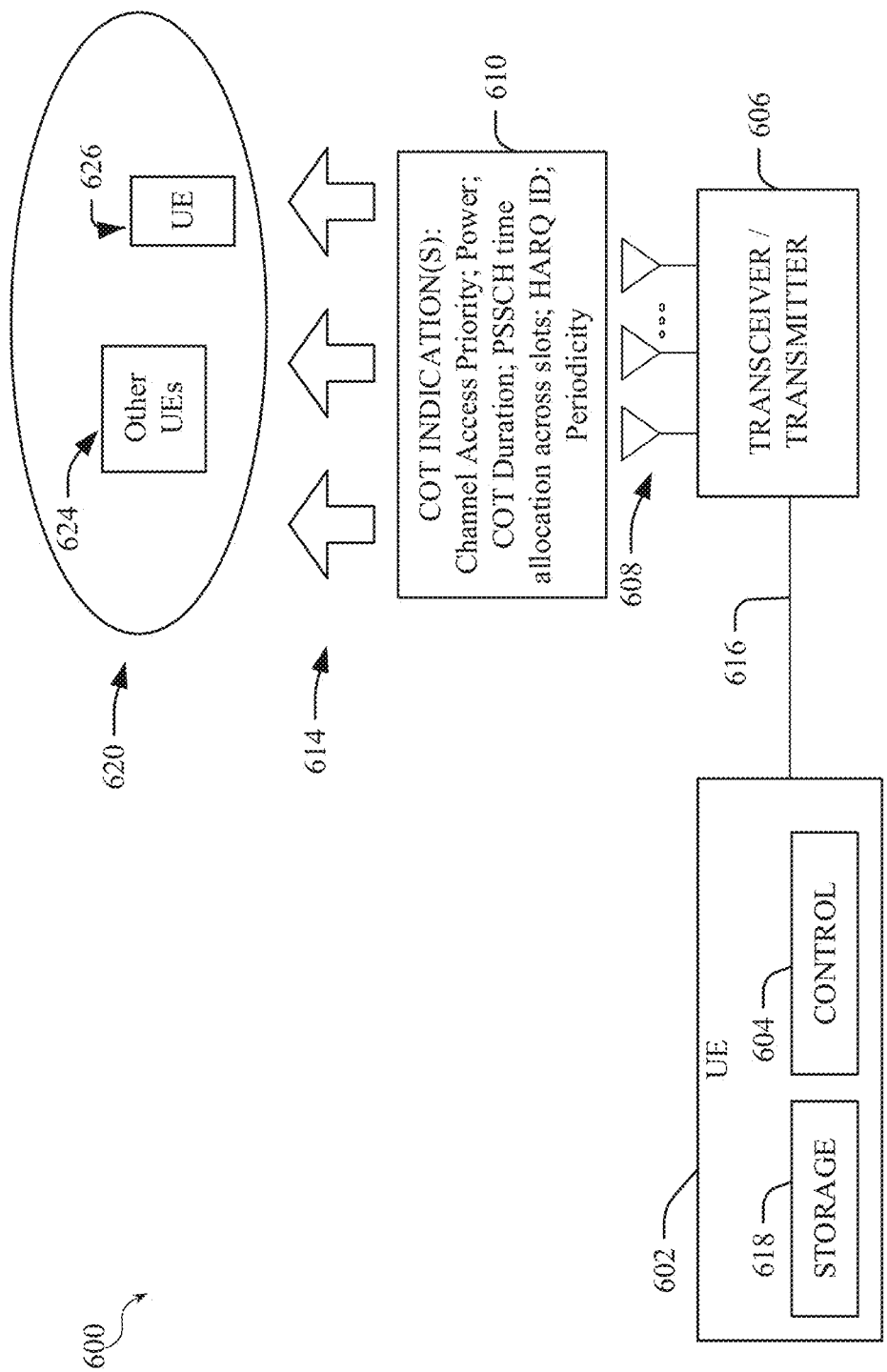
FIG. 6 another example SL communication for COT sharing in an NR unlicensed network in accordance with various aspects

FIG. 6 is a diagram illustrating a system 600 for sidelink communications as direct communication via one or more vehicle UEs or other network devices. The system 600 facilitates sidelink communications by enhancing reliability and accuracy to data during power saving procedures such as resource selection procedures, partial or reduced sensing operations, re-evaluation/pre-emption checking for aperiodic transmissions in SL operation, and congestion control. The system 600 can be employable at a UE or other network device (e.g., UE device 110) that facilitates mode-2 SL communication with another UE (e.g., UE 626, or other UEs devices 624) for resource selection based on partial sensing processes and UE behaviors, including re-evaluation/pre-emption checking and congestion control processes according to various aspects herein.

The system 600 includes a UE 602, a transceiver 606, and participant device entities 620, which can represent V-UEs, or any UE operating on an unlicensed network or NR unlicensed network that could participate in SL communication through direct communication to each other. The UE 602, for example, includes the transceiver 606, a storage component 618, and control circuitry or controller 604. The storage component 618 includes a memory, storage element and the like and is configured to store information for the UE 602. The controller 604 is configured to perform various operations associated with the UE 602. The controller 604 can include logic, components, circuitry, one or more processors (baseband circuitry processors 204A-E of FIG. 2 or other processing circuitry) for configuring SCI and SL communications. The transceiver 606 includes transmitter functionality and receiver functionality. The V-UE 602 also includes one or more antenna 608 for communications 614, which includes emergency services broadcast communications as well as SCI with the participant entities 620.

The participant device entities 620 include one or more other UEs 624, including infrastructure entities, vehicle entities, smart glass, and the like. The communications between the V-UE 602 and the participating device entities 620 includes Vehicle to Everything (V2X), which includes Vehicle to Vehicle (V2V), Vehicle to Infrastructure (V2I) and Vehicle to Pedestrian (V2P), and other network components or devices. The entities 620 can also include a road side unit (RSU), which is an entity that supports V2I and is implemented in a base station or a stationary/non-stationary UE/IoT, for example.

The sidelink communications between the V-UE 602 and the participating device entities 620 can utilize co-operative awareness that includes information from other vehicles, sensors, and the like, to process and share the information to provide vehicle services such as collision warning, autonomous driving, and the like.

The V2V communications can be between V-UEs that may be served by an evolved universal terrestrial access network (E-UTRAN) or where at least one of communicating V-UE may be out of network coverage for mode-2 SL communication. The V2I communications include application layer information to RSUs. The RSU sends application layer information to a group of UEs. The V2I also includes vehicle to network (V2N) communication where one party of the communications is a V/P-UE or UE and the other party is a serving entity, where both support V2N applications. The V2P can be SL communications that are between distinct UEs, including V/P-UEs and pedestrian associated UEs, where one UE is for each. The V2P communications include V2P related application information. This can include emergency services information through V2X communications and uses include, but not limited to, forward collision warning, control loss warning, V2V emergency vehicle warning, V2V emergency stop use case, V2I emergency stop use, wrong way driving warning, pre-crash sensing warning, warning against pedestrian collision, and the like.

Additionally or alternatively, resource (re)selection procedure/operations can include a resource exclusion, an iterative formation of a candidate resource set, SL-RSSI averaging of remaining resources, resource ranking and a randomized selection of resources from candidate resource set with minimum received energy. This can then be followed up with/preceded by and then sequentially repeated together with a sensing window/procedure to monitor the spectrum/medium/channels of communication by the UE and neighboring channels or communication devices detected according to aspects described herein.

In some aspects, rather than performing partial sensing, the UE 602 could be configured for full sensing, for example, as a CAT 4 CCA. UE 602 can also represent the transmitting UE 110-1 reporting in mode-2 SL communication to a receiver UE 620, for example, as UE 110-2. The UE 620 can be configured to also perform partial sensing, in which at least a minimum number of candidate slots could be configured for partial sensing, either from RRC signaling or a higher layer, for example, based on a the SCI from UE 602 with COT indications 610 in a first stage SCI, or a second stage SCI. COT indications 610 provided to the receiver UE 110-2 or 624, for example, can be from the initiating UE 602 and related to a SL-U COT for COT sharing in SL communication. The one or more COT indications 610 can comprise one or more of: a channel access priority indication, a power indication, a COT duration, a clear channel assessment (CCA) type, a cyclic prefix (CP) extension, a PSSCH frequency domain resource allocation, or a periodicity X indication that indicates one or more slots of the PSSCH comprising the second stage SCI, for example, in which X is an integer, as described herein.

While the methods described within this disclosure are illustrated in and described herein as a series of acts or events, it will be appreciated that the illustrated ordering of such acts or events are not to be interpreted in a limiting sense. For example, some acts can occur in different orders and/or concurrently with other acts or events apart from those illustrated and/or described herein. In addition, not all illustrated acts can be required to implement one or more aspects or embodiments of the description herein. Further, one or more of the acts depicted herein can be carried out in one or more separate acts and/or phases. Reference can be made to the figures described above for ease of description. However, the methods are not limited to any particular embodiment, aspect or example provided within this disclosure and can be applied to any of the systems/devices/components disclosed herein.

Figure 7:
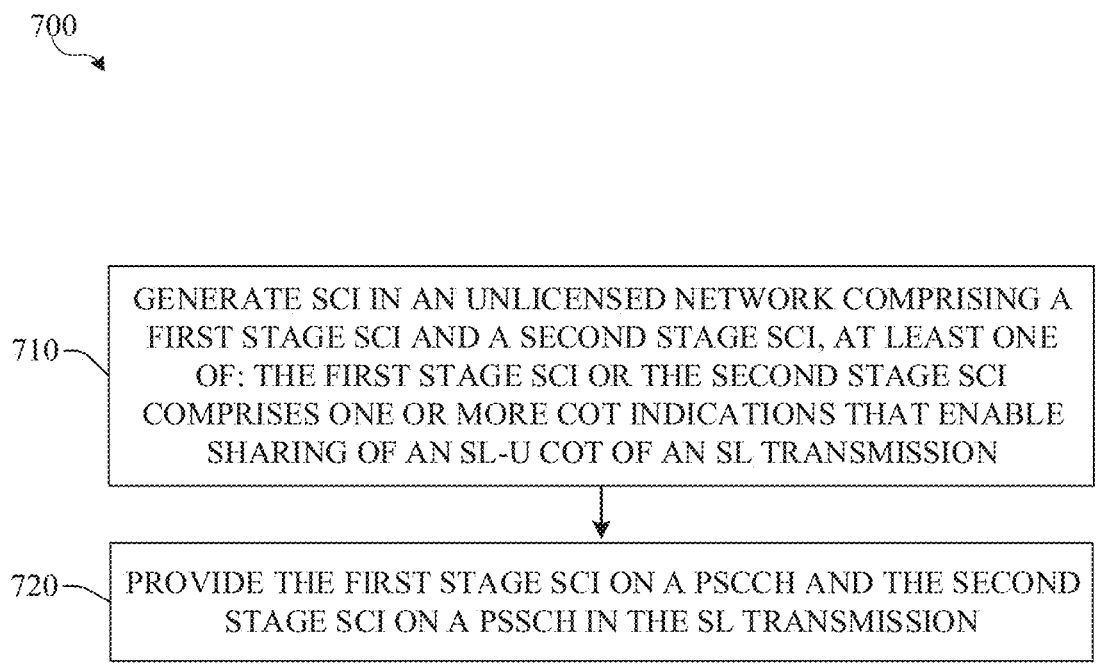
FIG. 7 illustrates an example process flow of SL communication according to various aspects.

Referring to FIG. 7, illustrated is an example process flow 700 for SL communication between UEs over an NR unlicensed network in accordance with various aspects. The process flow 700 can initiate at 710 by generating SCI in an NR unlicensed network comprising a first stage SCI and a second stage SCI, wherein at least one of: the first stage SCI or the second stage SCI comprises one or more COT indications that enable sharing of an SL-U COT of an SL transmission. At 720, the process flow 700 includes providing the first stage SCI on a PSCCH and the second stage SCI on a PSSCH in the SL transmission. The second stage SCI can comprise multiple slots of the PSSCH with different Hybrid Automatic Repeat Request (HARQ) process Identifiers (HARQ IDs) corresponding to the multiple slots, respectively, or a same HARQ process ID for each slot.

The UE can perform a CAT 4 CCA operation to acquire access to the SL-U COT of an SL channel based on a channel access priority. The COT indications, for example, can comprise a channel access priority indication of the channel access priority that was used to access the SL channel by the CAT 4 CCA operation, and indicate to a receiving UE in order to perform a lower or shorter CCA for sensing the SL channel for SL transmission back to the initiating UE. The channel access priority indication enables sharing of the SL-U COT with a same priority as the channel access priority or a higher priority than the channel access priority based on a downlink (DL) CAPC or an UL CAPC, for example. The receiving UE can perform a CCA that is shorter than a category (CAT) 4 CCA, and the SL transmission of the receiving UE can be based on traffic that is equal to or lower in priority than a DL CAPC or an UL CAPC of the channel access priority indication.

The COT indications can additionally or alternatively comprise at least one of: an energy detection threshold (EDT) or a transmission power to be used by the receiving UE when sharing of the SL-U COT. The initiating UE can operate to determine the EDT based on a power of a sensing operation performed on the SL channel. Alternatively, the initiating UE can receive the EDT or transmission power in a UE specific parameter of a radio resource control (RRC) signaling and share the EDT or transmission power with the receiver UE via the COT indications. Alternatively, the EDT is received in a unicast for pairs of UEs or a groupcast signaling, the UE could not necessarily include the power indication in the SCI and save on overhead signaling.

The COT indications can further comprise a COT duration indication that indicates at least one of: a total COT duration based on a priority class of a channel access priority indication, a maximum COT (MCOT), a multiple transmission time interval (Multi-TTI) SL PSSCH COT duration, or a remaining COT length for a receiving V2X device, or other UE.

The COT indications can also comprise a clear channel assessment (CCA) type and a cyclic prefix (CP) extension, based on a number of bits comprising up to six bits. The COT indications can also comprise a PSSCH frequency domain resource allocation that indicates an interlace type, or that an interlace is being used for the SL transmission based on one or more bit fields or a bitmap.

Figure 8:
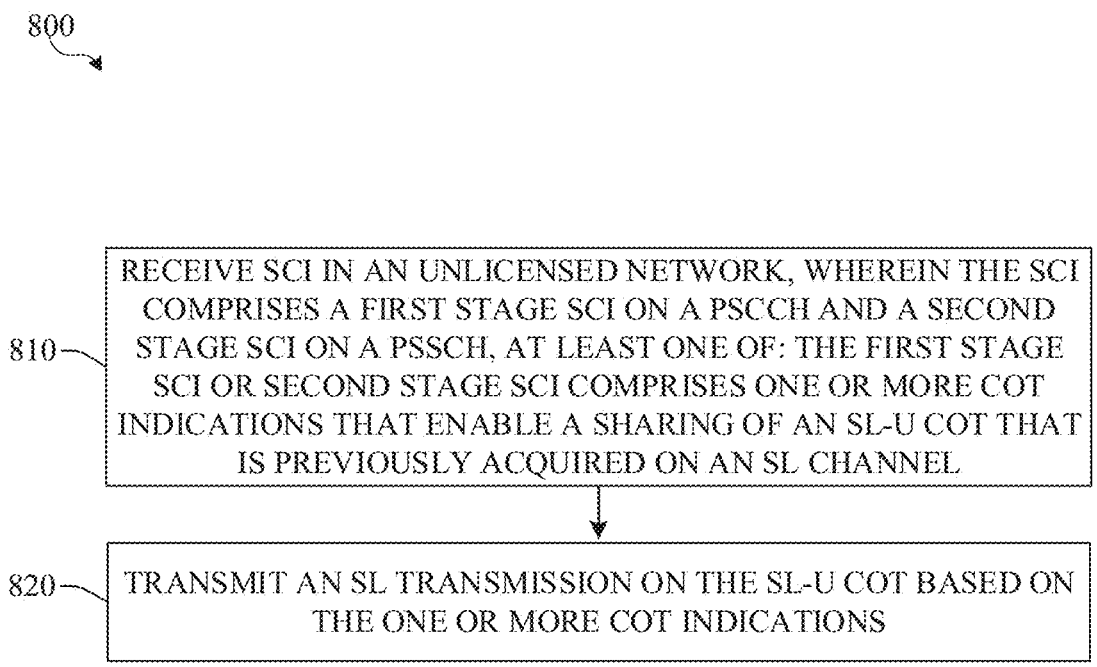
FIG. 8 illustrates another example process flow of SL communication according to various aspects.

Referring to FIG. 8, illustrated is an example process flow 800 for SL communication between UEs over an NR unlicensed network in accordance with various aspects. The process flow 800 can initiate at 810 receiving SCI in a NR unlicensed network, wherein the SCI comprises a first stage SCI on a PSCCH and a second stage SCI on a PSSCH, wherein at least one of: the first stage SCI or the second stage SCI comprises one or more COT indications that enable a sharing of an SL-U COT that is previously acquired on an SL channel. At 820, the process flow 800 includes transmitting an SL transmission on the SL-U COT based on the one or more COT indications.

The UE can be configured to perform a CCA on the SL channel based on a channel access priority indication of the COT indications. The CCA can be shorter than a CAT 4 CCA based on the channel access priority indication. The SL transmission can be based on traffic that is equal to or lower in priority than a DL CAPC or an UL CAPC of the channel access priority indication.

The UE can further receive at least one of: an energy detection threshold (EDT) or a transmission power to be used for the SL transmission from the one or more COT indications, a unicast signaling, or a groupcast signaling. In turn, the UE can generate the SL transmission based on the at least one of: the EDT or the transmission power, wherein the EDT is inversely proportion to the transmission power.

The COT indications can further include a COT duration indication that indicates one or more of: a total COT duration, a maximum COT (MCOT), a multiple transmission time interval (multi-TTI) SL PSSCH COT duration, or a remaining COT length. The total COT duration can be based on a priority class of a channel access priority used by an initiating UE device that previously acquired the SL channel, and the remaining COT length be based on the MCOT minus an initiating device transmission COT duration.

The PSSCH can comprise a plurality of slots with the second stage SCI being repeated in one or more slots of the plurality of slots. The one or more slots can comprise a same HARQ ID or different HARQ process IDs, respectively. The second stage SCI can be configured in every X slot of the plurality of slots, wherein X is a periodicity integer indicated by the first stage SCI. For example, the SCI can be averaged or span across every four slots, or other number of slots, and repeated based on the periodicity (e.g., every four slots or other number of slots).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure is described with reference to attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context can indicate that they are distinct or that they are the same.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example is a User Equipment (UE) comprising: a memory; processing circuitry, coupled to the memory, configured to, when executing instructions stored in the memory, cause the UE to: generate sidelink (SL) control information (SCI), wherein the SCI comprises a first stage SCI and a second stage SCI, and wherein at least one of: the first stage SCI or the second stage SCI comprises one or more channel occupancy time (COT) indications that enable sharing of an SL unlicensed (SL-U) COT of an SL transmission; and transmit the first stage SCI on a physical shared control channel (PSCCH) and the second stage SCI on a physical sidelink shared channel (PSSCH) in the SL transmission.

A second example can include the first example wherein the second stage SCI comprises multiple slots of the PSSCH with different Hybrid Automatic Repeat Request (HARQ) process Identifiers (HARQ IDs) corresponding to the multiple slots, respectively, or a same HARQ process ID for each slot.

A third example can include the first or second example, wherein the processing circuitry is further configured to: perform a category (CAT) 4 clear channel assessment (CCA) operation to acquire access to an SL channel based on a channel access priority, and wherein the one or more COT indications comprise a channel access priority indication of the channel access priority used to access the SL channel by the CAT 4 CCA operation.

A fourth example can include any one or more of the first through third examples, wherein the channel access priority indication enables sharing of the SL-U COT with a same priority as the channel access priority or a higher priority than the channel access priority based on a downlink (DL) channel access priority class (CAPC) or an uplink (UL) CAPC.

A fifth example can include any one or more of the first through fourth examples, wherein the one or more COT indications comprise at least one of: an energy detection threshold (EDT) or a transmission power to be used by a receiving device for sharing of the SL-U COT of the SL transmission.

A sixth example can include any one or more of the first through fifth examples, wherein the processing circuitry is further configured to: determine the EDT based on a power of a sensing operation performed on an SL channel, wherein the EDT and the transmission power of the one or more COT indications indicate the power to be used by a receiving device for sensing and transmitting, respectively, on the SL channel in response to sharing the SL-U COT; or receive the EDT in a UE specific parameter of a radio resource control (RRC) signaling.

A seventh example can include any one or more of the first through sixth examples, wherein the one or more COT indications comprise a COT duration indication that indicates at least one of: a total COT duration based on a priority class of a channel access priority indication, a maximum COT (MCOT), a multiple transmission time interval (Multi-TTI) SL PSSCH COT duration, or a remaining COT length for a receiving V2X device.

An eighth example can include any one or more of the first through seventh examples, wherein the one or more COT indications comprise a clear channel assessment (CCA) type and a cyclic prefix (CP) extension, based on a number of bits comprising up to six bits.

A ninth example can include any one or more of the first through eighth examples, wherein the one or more COT indications comprise a PSSCH frequency domain resource allocation that indicates an interlace used for the SL transmission based on one or more bit fields or a bitmap.

A tenth example can be a method comprising: receiving, via processing circuitry, sidelink (SL) control information (SCI) in a new radio (NR) unlicensed network, wherein the SCI comprises a first stage SCI on a physical shared control channel (PSCCH) and a second stage SCI on a physical sidelink shared channel (PSSCH), wherein at least one of: the first stage SCI or the second stage SCI comprises one or more channel occupancy time (COT) indications that enable a sharing of an SL unlicensed (SL-U) COT that is previously acquired on an SL channel; and transmitting an SL transmission on the SL-U COT based on the one or more COT indications.

An eleventh example can include the tenth example, wherein the processing circuitry is further configured to: performing a clear channel assessment (CCA) on the SL channel based on a channel access priority indication of the one or more COT indications, wherein the CCA is shorter than a category (CAT) 4 CCA, and the SL transmission is based on traffic that is equal to or lower in priority than a downlink (DL) channel access priority class (CAPC) or an uplink (UL) CAPC of the channel access priority indication.

A twelfth example can include any one or more of the tenth through eleventh examples, wherein the processing circuitry is further configured to: receiving at least one of: an energy detection threshold (EDT) or a transmission power to be used for the SL transmission from the one or more COT indications, a unicast signaling, or a groupcast signaling; and generating the SL transmission based on the at least one of: the EDT or the transmission power, wherein the EDT is inversely proportion to the transmission power.

A thirteenth example can include any one or more of the tenth through twelfth examples, wherein the one or more COT indications comprise a COT duration indication that indicates at least one of: a total COT duration, a maximum COT (MCOT), a multiple transmission time interval (Multi-TTI) SL PSSCH COT duration, or a remaining COT length, wherein the total COT duration is based on a priority class of a channel access priority used by an initiating vehicle-to-everything (V2X) device that previously acquired the SL channel, and the remaining COT length is based on the MCOT minus an initiating device transmission COT duration.

A fourteenth example can include any one or more of the tenth through the thirteenth examples, wherein the one or more COT indications comprise one or more indications of at least one of: a clear channel assessment (CCA) type, a cyclic prefix (CP) extension, or a PSSCH frequency domain resource allocation that indicates an interlace used for the SL transmission.

A fifteenth example can include any one or more of the tenth through the fourteenth examples, wherein the PSSCH comprises a plurality of slots with the second stage SCI being repeated in one or more slots of the plurality of slots, wherein the one or more slots comprise a same Hybrid Automatic Repeat Request (HARQ) process Identifiers (HARQ ID) or different HARQ process IDs, respectively, and wherein the second stage SCI is in every X slot of the plurality of slots, wherein X is a periodicity integer indicated by the first stage SCI.

A sixteenth example can be a baseband processor configured to cause a user equipment (UE) to: generate sidelink (SL) control information (SCI), wherein the SCI comprises a first stage SCI and a second stage SCI, and wherein at least one of: the first stage SCI or the second stage SCI comprises one or more channel occupancy time (COT) indications that enable sharing of an SL unlicensed (SL-U) COT of an SL transmission; and provide the first stage SCI on a physical shared control channel (PSCCH) and the second stage SCI on a physical sidelink shared channel (PSSCH) in the SL transmission.

A seventeenth example can include the sixteenth example, wherein the one or more COT indications comprise at least one of: a channel access priority indication, a power indication, a COT duration, a clear channel assessment (CCA) type, a cyclic prefix (CP) extension, a PSSCH frequency domain resource allocation, or a periodicity X indication that indicates one or more slots of the PSSCH.

An eighteenth example can include any one or more of the sixteenth through seventeenth examples, further configured to cause the UE to: determine an energy detection threshold (EDT) based on a sensing operation performed of an SL channel and a transmission power, based on a non-vehicle-to-everything (V2X) device parameter or based on a path loss of a sidelink paired device during a device-to-device (D2D) discovery operation; and provide at least one of: the EDT or the transmission power according to a decibel level as a power indication in the one or more COT indications.

A nineteenth example can include any one or more of the sixteenth through eighteenth examples, further configured to cause the UE to: receive an energy detection threshold (EDT) in a radio resource control (RRC) signaling in a UE specific parameter, a unicast for sidelink pairs, or a groupcast for a sidelink group; and in response to receiving the EDT in the UE specific parameter, provide the EDT in the one or more COT indications.

A twentieth example can include any one or more of the sixteenth through nineteenth examples further configured to cause the UE to: transmit the second stage SCI in a first slot, each slot, or a periodicity of slots of the PSSCH, with a same HARQ process ID or different HARQ process IDs for each slot.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s)

and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A User Equipment (UE) comprising:
radio frequency (RF) circuitry;
a memory;
processing circuitry coupled to the RF circuitry and the memory, the processing circuitry configured to execute instructions stored in the memory to cause the UE to:
receive a first stage sidelink control information (SCI) on a physical sidelink control channel (PSCCH) and a second stage SCI on a physical sidelink shared channel (PSSCH), wherein at least one of: the first stage SCI or the second stage SCI comprises one or more channel occupancy time (COT) indications that enable COT sharing for a sidelink (SL) transmission;
determine a maximum energy detection threshold (EDT) based on a value $T_A$, wherein $T_A$ is equal to a first value when the SL transmission includes a synchronization signal block (SSB); and
transmit, via the RF circuitry, the SL transmission on a physical sidelink feedback channel (PSFCH) based on the one or more COT indications and an EDT, wherein the EDT is less than or equal to the maximum EDT.

2. The UE of claim 1, wherein the first value is equal to 5 decibels (dB).

3. The UE of claim 1, wherein $T_A$ is equal to a second value when the SL transmission does not include the SSB, and wherein the second value is greater than the first value.

4. The UE of claim 3, wherein the second value is equal to 10 decibels (dB).

5. The UE of claim 1, wherein the processing circuitry is further configured to cause the UE to:
in response to generating the PSFCH in multiple resource blocks (RB) sets with an interlaced waveform, transmitting the PSFCH with a transmission bandwidth equal to a multiple of a total number of RB sets in the multiple RB sets.

6. The UE of claim 5, wherein the processing circuitry is further configured to cause the UE to:
transmit the PSFCH based on an actual bandwidth corresponding to the PSFCH in response to not generating the PSFCH in the multiple resource blocks (RB) sets with the interlaced waveform.

7. The UE of claim 1, wherein the EDT is based on a transmission power of the PSFCH.

8. The UE of claim 1, wherein the one or more COT indications comprise at least one of: the EDT or a transmission power to be used for the SL transmission.

9. The UE of claim 8, wherein the processing circuitry is further configured to cause the UE to:
receive at least one of: the EDT or the transmission power to be used for the SL transmission in the one or more COT indications, a unicast signaling, or a groupcast signaling; and
transmit the SL transmission based on the at least one of: the EDT or the transmission power, wherein the EDT is inversely proportional to the transmission power.

10. A method comprising:
transmitting a first stage sidelink control information (SCI) on a physical sidelink control channel (PSCCH) and a second stage SCI on a physical sidelink shared channel (PSSCH), wherein at least one of: the first stage SCI or the second stage SCI comprises one or more channel occupancy time (COT) indications that enable COT sharing for a sidelink (SL) transmission; and
receiving the SL transmission on a physical sidelink feedback channel (PSFCH) based on the one or more COT indications and an energy detection threshold (EDT), wherein the EDT is less than or equal to a maximum EDT that is calculated based on a value $T_A$, wherein $T_A$ is equal to a first value when the SL transmission includes a synchronization signal block (SSB).

11. The method of claim 10, further comprising:
determining the EDT based on a power of a sensing operation performed on a SL channel, wherein the EDT and a transmission power of the one or more COT indications indicate the power to be used by a receiving device for sensing and transmitting, respectively, on the SL channel in response to sharing the COT; or receiving the EDT in a user equipment (UE) specific parameter of radio resource control (RRC) signaling.

12. The method of claim 10, wherein the first value is equal to 5 decibels (dB).

13. The method of claim 12, wherein $T_A$ is equal to a second value when the SL transmission does not include the SSB, and wherein the second value is equal to 10 decibels (dB).

14. A baseband processor configured to, when executing instructions stored in memory, perform operations comprising:

receiving a first stage sidelink control information (SCI) on a physical sidelink control channel (PSCCH) and a second stage SCI on a physical sidelink shared channel (PSSCH), wherein at least one of: the first stage SCI or the second stage SCI comprises one or more channel occupancy time (COT) indications that enable COT sharing for a SL transmission;

determining a maximum energy detection threshold (EDT) based on a value $T_A$, wherein $T_A$ is equal to a first value when the SL transmission includes a synchronization signal block (SSB); and providing the SL transmission to a radio frequency (RF) interface for transmission on a physical sidelink feedback channel (PSFCH) based on the one or more COT indications and an EDT, wherein the EDT is less than or equal to the maximum EDT.

15. The baseband processor of claim 14, wherein the operations further comprise:

in response to generating the PSFCH in multiple resource blocks (RB) sets with an interlaced waveform, providing the PSFCH with a transmission bandwidth equal to a multiple of a total number of RB sets in the multiple RB sets.

16. The baseband processor of claim 14, wherein the operations further comprise:

receiving the EDT in a user equipment (UE) specific parameter in radio resource control (RRC) signaling, a unicast signal for sidelink pairs, or a groupcast signal for a sidelink group; and in response to receiving the EDT in the UE specific parameter, providing the EDT in the one or more COT indications.

17. The baseband processor of claim 14, wherein the operations further comprise:

determining a transmission bandwidth for the SL transmission based on whether a continuous waveform or an interlaced waveform is used for the SL transmission.

18. The UE of claim 1, wherein the first stage SCI comprises a SCI format 1-A.

19. The UE of claim 1, wherein the second stage SCI comprises an SCI format 2-A.

20. The UE of claim 1, wherein the processing circuitry is further configured to cause the UE to determine the maximum energy detection threshold (EDT) based on the value $T_A$ in response to the absence of any other technology sharing the channel not being guaranteed on a long-term basis.

* * * * *